Nov. 18, 1924. 1,515,607
F. C. MONKS
FRUIT TRIMMING MACHINE
Filed Feb. 11, 1924 6 Sheets-Sheet 1

INVENTOR.
Francis Charles Monks
BY Lyon & Lyon
ATTORNEYS

Nov. 18, 1924.

F. C. MONKS 1,515,607

FRUIT TRIMMING MACHINE

Filed Feb. 11, 1924 6 Sheets-Sheet 5

Fig. 5.

INVENTOR.
Francis Charles Monk.
BY Lyon & Lyon
ATTORNEYS.

Patented Nov. 18, 1924.

1,515,607

UNITED STATES PATENT OFFICE.

FRANCIS CHARLES MONKS, OF HONOLULU, TERRITORY OF HAWAII.

FRUIT-TRIMMING MACHINE.

Application filed February 11, 1924. Serial No. 692,051.

*To all whom it may concern:*

Be it known that I, FRANCIS CHARLES MONKS, a citizen of the United States, residing at Honolulu, Territory of Hawaii, have invented a new and useful Fruit-Trimming Machine, of which the following is a specification.

This invention relates to a machine for cutting or trimming fruit, and while features of the invention are applicable to machines of any kind constructed to operate upon fruit, in the present specification, the invention is described as applied to a machine for trimming the ends of pineapples after the body of the fruit has been cored and its form reduced substantially to the form of a cylinder or cylindrical block. The pineapples or "pines" are reduced to this cylindrical form by an automatic machine and that machine leaves a small portion at each end of the fruit unpeeled. The special function of the present machine is to trim the ends of the fruit and remove the remaining peeling and eyes. Heretofore this has been done by hand.

The general object of this invention is to produce a simple and efficient machine for cutting, peeling, or trimming fruit; also to provide a machine in which the fruit will be automatically fed in, held, and trimmed, and in which the cutters which trim the fruit are automatically controlled by the position of the side or end of the fruit adjacent the point where it is being trimmed, the general purpose being, in this respect, to prevent waste of the fruit in trimming it.

Further objects of the invention will appear hereinafter.

The invention consists in the novel parts and combination of parts to be described hereinafter, all of which contribute to produce an efficient fruit trimming machine.

A preferred embodiment of the invention is described in the following specification while the broad scope of the invention is pointed out in the appended claims.

Figures 7, 8, 9, 10:
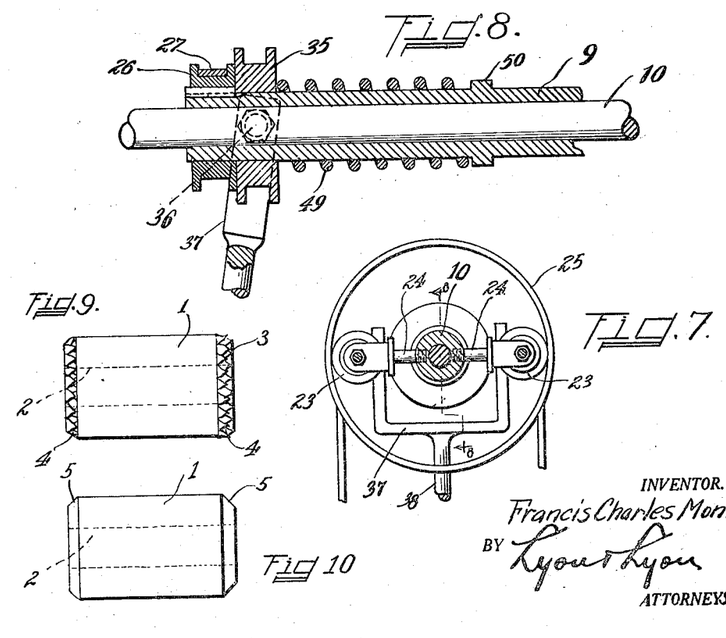
Fig. 7 is a vertical cross section taken about on the line 7—7 of Figure 2, and particularly illustrating the construction associated with the cutter spindles, illustrating the means for imparting the force to the cutters which advances them when they are to trim the fruit.
Fig. 8 is a longitudinal section taken about on the line 8—8 of Figure 7.
Fig. 9 is a side elevation showing the "blocked" or partially trimmed fruit and illustrating its condition when it is fed to the cutters of this machine.
Fig. 10 is a side elevation showing the fruit after being trimmed in this machine.

In practicing my invention, I provide means for supporting the fruit, and I provide a pair of cutters which are mounted so that they are movable toward and from the fruit; in addition to this, I provide means for producing a relative rotation of the fruit and cutters to effect the trimming of the fruit. I prefer to construct the machine so that the fruit is held stationary while the cutters revolve to trim the fruit. While mechanism constructed in this way may be used for any general purpose in trimming fruit or performing operations of this general nature, this machine is intended specially to be used to trim the untrimmed ends of pineapples which have first been treated in a machine popularly known as the Ginaca machine. Fig. 9 shows the "blocked" or partially trimmed pineapple as it comes from the Ginaca machine. That machine produces a cylindrical body 1, having a bore 2 extending completely through it which has removed the core of the fruit. The ends 3 of the pineapple are cut off square and at each end there is a belt or zone 4 on the exterior of the fruit which is not peeled. The special function of this machine is to remove this zone 4 of peeling at each end of the fruit. In doing this a beveled face 5 is cut at each end of the fruit which reduces the fruit to the form shown in Figure 10.

In order to accomplish this the machine is constructed of an upright frame 6 including a rectangular upper frame or table frame 7. This table frame 7 supports the upper portion of the mechanism and most of the automatic controlling mechanism is located in the frame below the table frame 7.

In order to support the cutters so that they are rotatable and at the same time to enable them to have a forward movement and return movement to trim the fruit, I provide two oppositely disposed cutter heads 8 rotatable on central axes, the cutters of each head being disposed about the axis of rotatation. These cutter heads may be identical in construction and this is also true of the mechanism immediately associated with them for operating them. It will therefore suffice to describe the details of one of these cutter heads and its associated parts. Each cutter head is of cylindrical shape and is in the form of an enlargement on the end of a sleeve 9 carried on a rotatable spindle or shaft 10, the outer end of which is mounted to slide in a pedestal bearing 11 mounted on the adjacent end of the table frame 7.

The cutters are mounted on the rotary head 8 in such a way as to perform their function as the cutter head 8 rotates on the axis of the spindle 10. Any suitable form of knives or cutters may be used to accomplish this, but I prefer to provide individual cutters 12, there being two corresponding to each cutter head, disposed diametrically opposite to each other, and each cutter is mounted to rotate on an axis which is inclined to the axis of rotation of the head. Furthermore the cutters are mounted in brackets so that they can be adjusted to alter the angle of the axis of each individual cutter and also its relation to the cutter head. In order to accomplish this, on each side of the cutter head, I provide a bracket 13 in the form of a small plate which at its forward end is attached to the side of the bracket by means of a pivot screw 14. Near its outer end the bracket is formed with an arcuate slot 15 receiving a clamping screw 16 which enables the bracket to be secured in any adjusted position after rotating it on the axis of the pivot screw or bolt 13. Each bracket at its inner end, that is to say, the end which is adjacent to the pivot screw 14 is provided with a collar 17 which is adjustably secured to it on a pivot bolt 18 and in this collar a bearing 19 is secured which carries the shaft 20 of the cutter 12. These cutters are of substantially the form indicated so as to present a circumferential cutting edge which will cut off the peeling of the fruit when the cutters are brought into contact with it.

Suitable means are provided for rotating the shafts 20 of these cutters. This is preferably accomplished by means of a flexible shaft 22 attached to the tail end of each shaft and these shafts 22 are driven respectively by means of two rollers 23, each roller 23 being carried on an arm 24 which projects radially from the sleeve 9. When the spindle is rotated the faces of these rollers 23 run around on the inner face of an annular race way or ring 25; in other words they are rotated by a frictional contact with the fixed annular frame or ring 25 which is secured to the frame. This rotates the cutters at a high velocity and the flexible shafts 22 permit of the angle of the cutters being adjusted as may be desired, that is to say, they permit adjustment of the cutters on the adjusting bolts 18, as well as the adjustment of the cutter brackets.

Suitable means is provided for rotating the spindles 10 and in the present machine this is accomplished by providing a belt pulley 26 secured to each spindle and driven by a narrow belt 27, the lower end of which passes around a wide driving pulley 28 carried on a driven shaft 29. In this way two oppositely disposed driven shafts 29 are provided which are driven by means of beveled gear 31, a large driving beveled gear 30 being carried on a driving shaft 32 mounted in suitable bearings in the lower part of the frame, see Figure 2. In order to guide the belt 27 and prevent its being displaced while the spindles 10 are traveling forward and backward, I provide each belt 27 with a small guide pulley 33 mounted to slide on an arbor 34.

Figure 2:
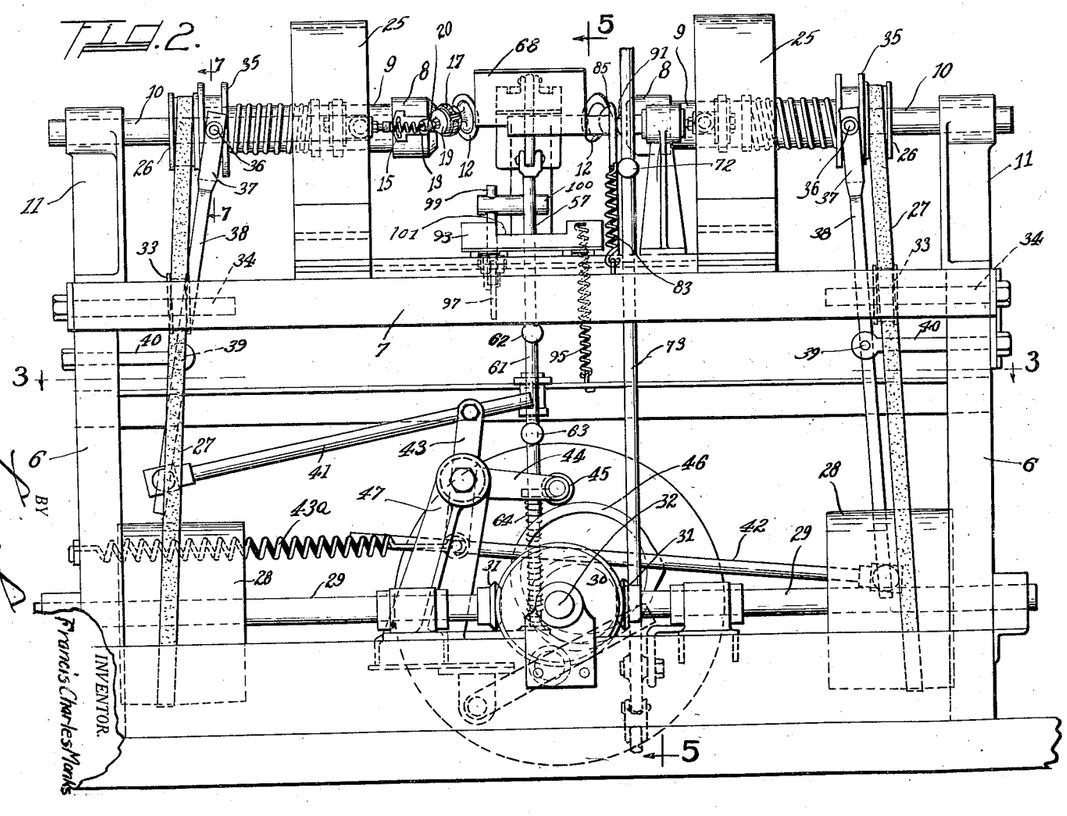
Fig. 2 is a side elevation of the machine shown in Figure 1, partially broken away.
Figure 3:
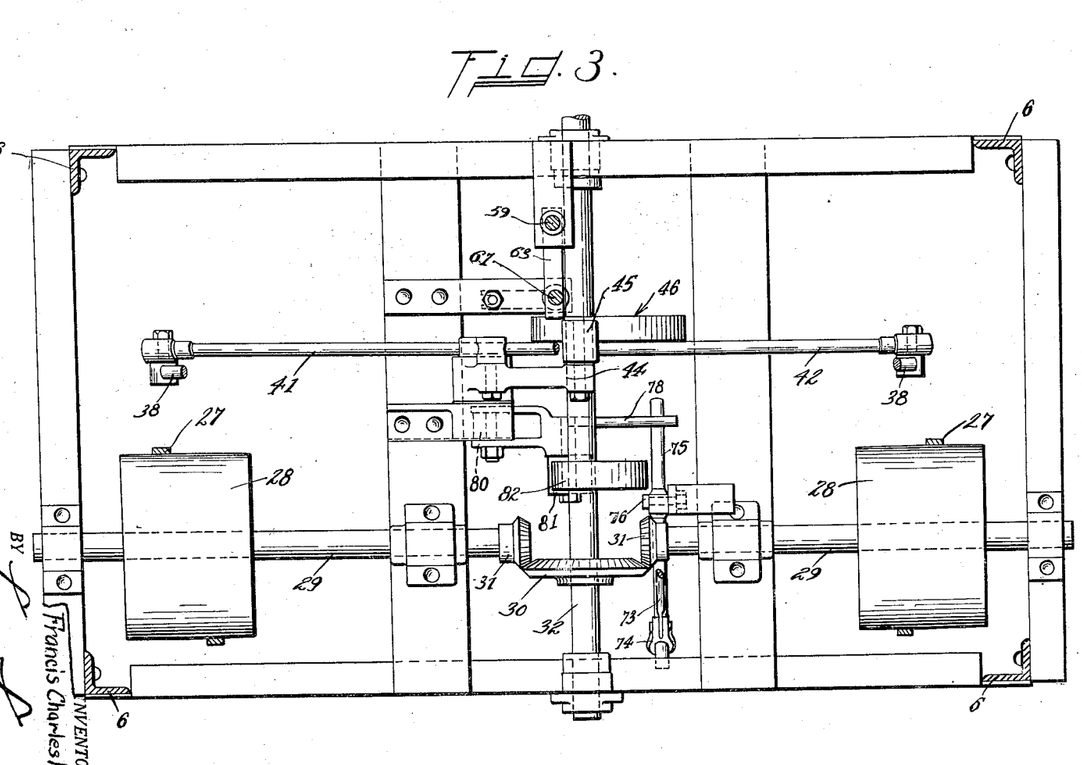
Fig. 3 is a horizontal section through the machine taken at a point below the table and about at the position of the line 3—3 of Figure 2.
Figure 4:
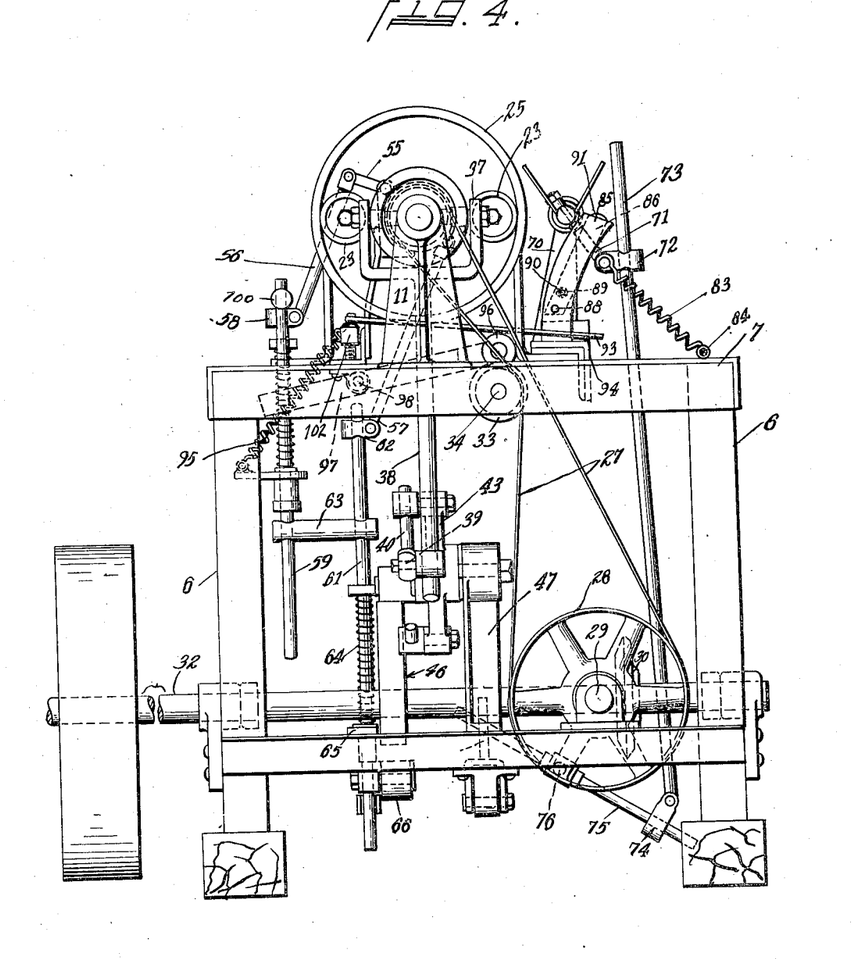
Fig. 4 is an end elevation of the machine and shows it as viewed from the left end of Figure 2.

In order to shift the cutter heads 8 forward and backward automatically at the proper time, each sleeve 9 is provided with a loose collar 35, see Figures 2 and 8. Each of these collars is a grooved collar cooperating with pins 36 carried on the ends of a yoke 37, each yoke being carried on the upper end of a rock-lever 38 having its fulcrum at 39 on a fixed arm 40 carried by the end of the frame. The lower ends of these rock-levers 38 are connected by links 41 and 42, respectively, with the arms of a double bell-crank lever 43 having an actuating arm 44 carrying a roller 45 actuated by a cam 46 carried on the aforesaid driving shaft 32, see Figure 2. This rock-lever 43 is mounted on a suitable bracket 47 attached to the frame, and has a coiled spring 43ª to hold the roller 45 against its cam. At the proper moment in the operation of the machine this cam 46 operates to rock the upper ends of the rock-levers 38 inwardly and this advances the cutter heads toward the fruit which is held in position between them by means which will be described hereinafter. The fruit as it comes from the rough trimming machine or Ginaca machine is of course of various length and, hence, if the cutter heads positively advanced to a certain predetermined position every time they operated, the result would be that they would in some cases cut off too much fruit and in others possibly not enough to perfectly trim the fruit. For this reason I provide special means which controls the amount of advance of the cutter head by the position of the end face 3 of the fruit itself. I accomplish this in a very simple manner by providing a fixed stop plate or gage 48 on the inner end or forward end of each cutter head, and I impart the force to the cutter head from the grooved pulley 35 through a coil spring 49, see Figure 8, one end of which thrusts against the pulley 35, and the other end of which thrusts against the collar 50 on the sleeve 9. In this way, in the operation of the machine the cutter heads are pushed up against the end of the fruit by a yielding force and as soon as the stop plate 48 comes against the end of the fruit, the advancing movement of the cutter heads and the rotary cutters 12 ceases although the springs 49 will permit a further movement of the grooved pulleys 35. In other words I provide a construction which enables the cutters to operate in the same way against all of the articles of fruit which are trimmed in the machine; and they will operate in this way whatever be the length of the fruit, within the range or limits of the machine.

The race rings 25 are, of course, of considerable width measured parallel with the longitudinal axis of the machine so as to insure that the rollers 23 will always be in contact with the inner faces of these rings in any position that the cutter heads or their spindles may assume.

I shall now describe the means for holding the fruit in position between the cutter heads and the means for feeding the fruit to the fruit holder. The construction and mode of operation of these parts will be most clearly understood by reference to Figures 5 and 6. Each holder comprises a body or block 51 attached to a fixed bracket 52, and comprises jaws 53 and 54 which are adapted to swing apart so as to open the holder. In other words, I prefer to construct the holder in such a way that it opens on its side, see Figure 6. To do this the jaws 53, 54, are pivoted to the block 51 and the jaw 53 has an operating arm 55, which carries an operating link 56. The other jaw is pivotally attached to an operating link 57. These links extend downwardly substantially parallel with each other and are operated in unison. In order to do this the lower end of the link 56 is pivotally attached to a collar 58 secured on a vertically guided stem 59 carrying a coil spring 60 which exerts an upward thrust on the stem, that is to say, it exerts its force in a direction to swing the jaw 53 to its closed position. A similar stem 61 corresponding to the link 57 carries a collar 62 pivotally connected with the link 57 and these two stems 59 and 61 are connected together by a rigid cross head 63. I impart a movement to the stem 61 at the proper time which is transmitted through the cross head 63 to the stem 59 so that the two jaws will operate in unison. The stem 61 is suitably guided in the frame of the machine and provided with a coil spring 64 similar to the spring 60 which exerts its force in a direction to close the jaws. The lower end of this stem 61 passes through a suitable guide 65 below which it carries a roller 66 which is engaged at the proper time by the face of the cam 46 carried on the aforesaid main shaft 32 of the machine.

In the operation of the machine this cam 46 pulls the stems 61 and 59 down at the proper moment and at this moment other automatic mechanism of the machine operates to feed the fruit 1 into the holder. I shall now describe this automatic feed device. It is preferably in the form of a V-shaped hopper 68, see Figure 5, which is normally held in a position to hold the fruit, and which is movable in such a way that at the proper instant it moves or rocks and delivers the fruit into the holder. For this purpose the V-shaped hopper is carried on a rock shaft 69 mounted to rotate in a suitable bearing 70. On the under side of the rock shaft 69, (when the hopper 68 is in its upright position), it is provided with a short arm 71, see Figure 5, which extends down in an inclined direction and is pivotally attached at its outer end to a collar 72 rigidly secured to an actuating stem 73. This stem extends downwardly to a point near the floor where it is pivotally attached to a collar 74 carried on the end of a rock lever 75, said rock lever being mounted to rock on a fulcrum 76, and having a short arm 77 beyond the fulcrum which is engaged by an actuating lever 78 at the proper time to elevate the stem 73; this movement swings the hopper 68 toward the center of the machine and dumps the fruit out of the hopper into the holder, see Figure 6. The lever 78 is pivotally mounted at 79 on the lower end of a bracket 80 and has a roller 81 on its side which is engaged and operated by a cam 82 which is also carried by the main shaft 32. In this way at the proper moment the lever 78 is rocked down so as to engage the arm 77 and effect the dumping of the hopper 68.

Figure 5:
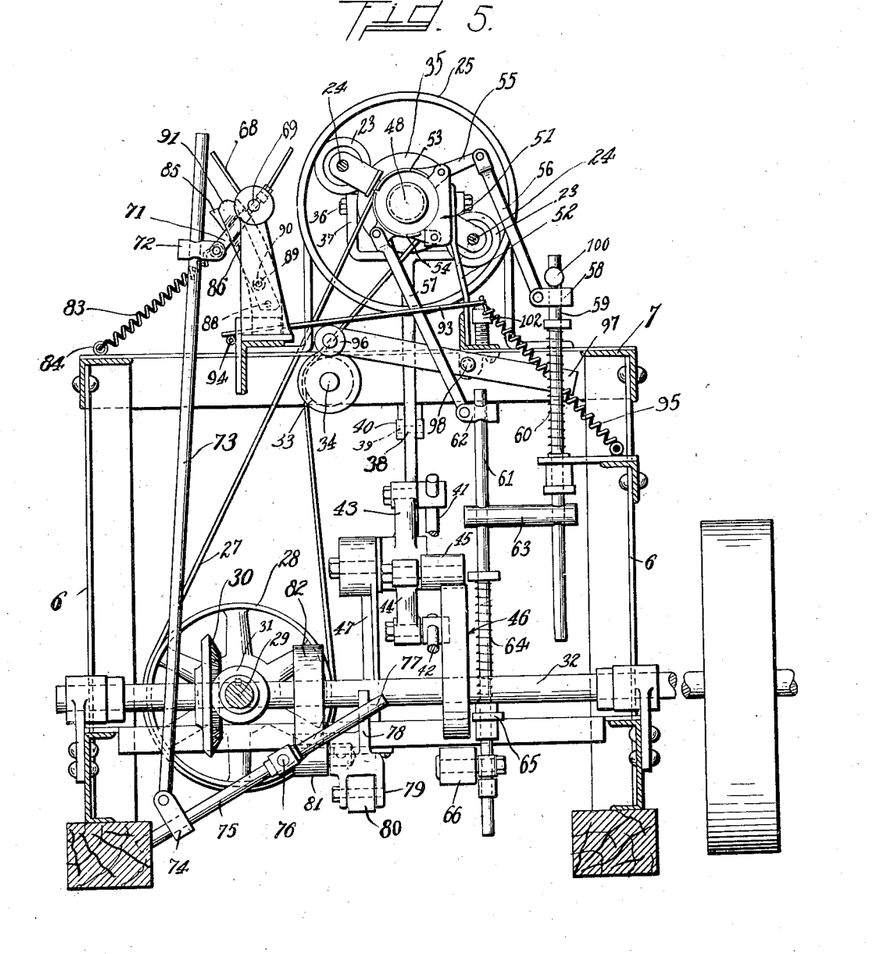
Fig. 5 is a vertical section taken through the machine about at the location of the line 5—5 of Figure 2.
Figure 6:
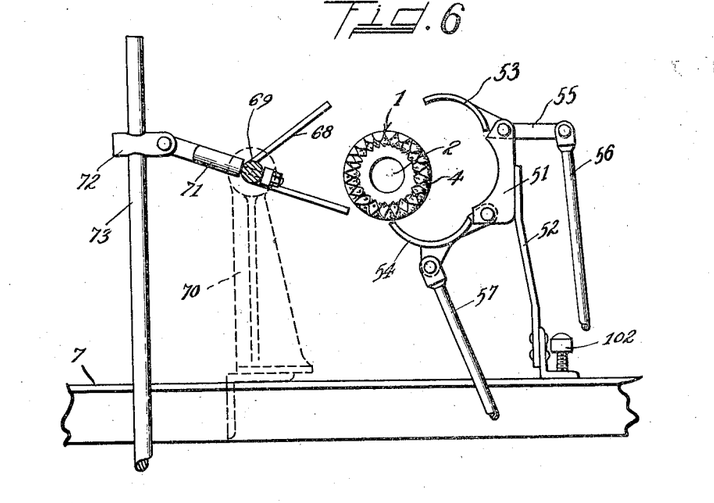
Fig. 6 is a detail view particularly illustrating the operation of the feed device and the fruit holder, shown partly in elevation and partly in section, certain parts being broken away.

In order to return the hopper 68 to its normal upright position, I provide a coil spring 83, the lower end of which is attached to the frame at 84, see Figure 5, and the upper end of which is attached to the pivotal connection between the collar 72 and the arm 71.

I provide additional means for yieldingly holding the hopper 68 in its upright position, and for this purpose I provide a bracket 85 which extends up from the table frame of the machine so that its side face lies adjacent to the plane of movement of the arm 71. On the side face of the bracket 85 I provide a spring pressed jaw 86 which is formed with a rudimentary socket 87 to receive the arm 71, the lower end of this jaw being secured by a pivot screw 88 to the side of the bracket 85. A spring 89 is provided for holding this yielding jaw 86 against the side of the bracket 85. This spring may be in the form of a coil spring carried on a bolt 90 which passes through an opening in the jaw 86 and is secured in the bracket 85. The upper end of the jaw 86 has an outwardly flared end or guide lip 91, and an inclined guide face 92 is provided opposite to it on the bracket 85. In this way a V-shaped throat is formed into which the arm 71 moves when it is swinging down during the return movement of the hopper.

After the fruit has been trimmed it simply falls out of the holder when the jaws 53 and 54 are opened automatically by the machine. I provide means for throwing the trimmed fruit to the side after it is released by the jaws.

For this purpose I provide an ejector in the form of a plate 93, see Figure 5, which is mounted to rock on a hinge or axis 94. This plate extends in an inclined direction underneath the fruit holder and is normally held down by a coil spring 95 so that it rests against a roller 96 on the upper end of a lever 97 movable on a fulcrum 98. This lever is raised automatically at the proper time by means of an actuating stem 99 having a crosshead 100 connecting it to the stem 59, see Figures 1 and 2, and which projects over the lever 97.

Figure 1:
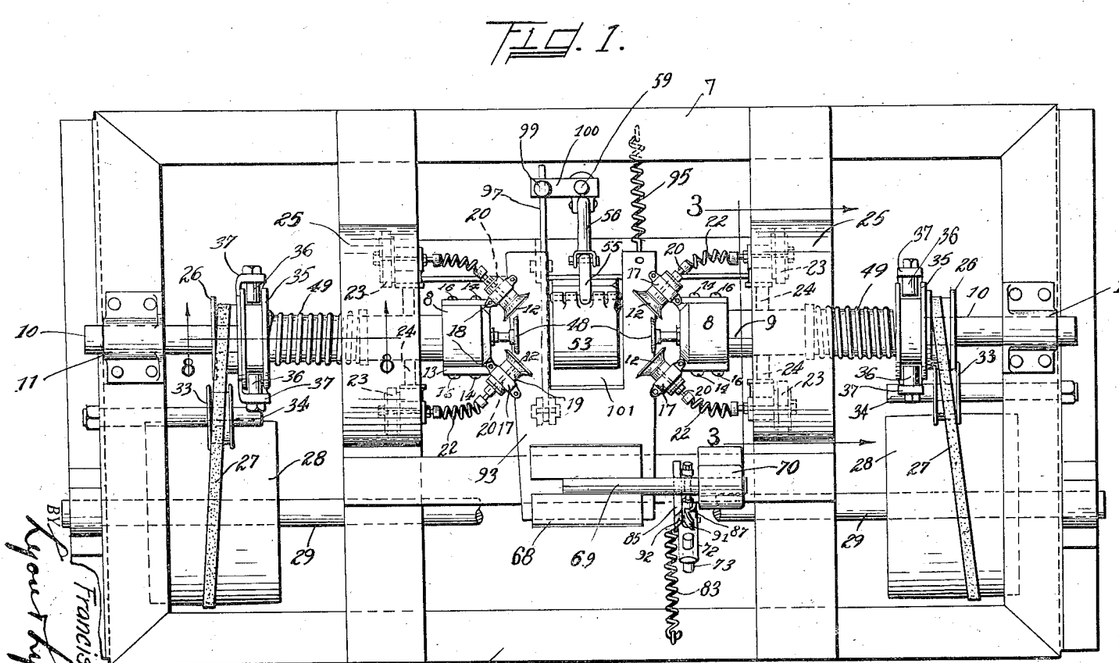
Figure 1 is a plan of a machine embodying my invention.

This plate 93 is provided with a central opening 101, see Figure 1, which permits the jaw 54 to substantially pass down through the plate when the free end of the plate swings upwardly in the ejecting movement.

However, the opening 101 is much shorter than the fruit so that when the jaws open, the ends of the fruit will be supported on the ends of the plate 93 beyond the opening, that is to say, the opening 101 is not long enough to let the fruit through it.

The outer end of the plate 93 rests upon an adjustable stop screw 102, see Figure 5.

I shall now describe the general mode of operation of the machine. The fruit 1, see Figure 9, is placed by hand in the hopper 68. As the mechanism of the machine moves, the hopper 68 is rocked through the medium of the stem 73, see Figure 5, and through the agency of the cam 82, so as to rock the hopper 68 inwardly; in this way the fruit is rolled out of the hopper and into the open fruit holder, see Figure 6, the jaws of which are at this moment held in open position. The jaws 53 and 54 then close automatically through the operation of the stems 59 and 61 and their springs 60 and 64, this movement being permitted by the cam 46. The jaws then clamp the fruit in a fixed position with its axis substantially in alinement with the axes of the cutter heads 8. Through the operation of the cam 46 the bell crank lever 43 is then actuated, see Figure 2, so as to actuate the links 41, 42 and this movement actuates the rock levers 38 so as to advance the cutter heads 8 toward the fruit. This movement is imparted to the cutter heads through the springs 49 and the advancing movement of the cutter heads ceases when the stop plates 48, see Figure 1, carried by the cutter heads engage the ends of the fruit. This amount of advance of the cutter heads should be sufficient to cut off the remaining untrimmed portion 4 of the peeling of the pineapple, see Figure 9. The cutter heads, of course, are rotated continuously by the belts 27, and the rotation of the cutter heads, through the agency of the rollers 23 and the circular race-ways 25, rotates the flexible shafts 22 which drive the cutters. In this way the cutter heads not only rotate about their axis, but each individual cutter rotates on its own axis.

By reason of the brackets 13 and the adjusting bolts 18 carried by the brackets, the angular position of the cutters may be adjusted, as desired.

After the cutters have operated, the cutter heads withdraw automatically, and the jaws 53 and 54 open automatically and permit the fruit to fall onto the ejector plate 93 which is then operated so as to throw the trimmed fruit out of the machine and to one side.

If desired, the stems of the stop plates or gage plates 48 may be threaded, and adjustable so as to facilitate adjustment of the depth of cut, or length of the beveled portion of the fruit.

It is understood that the embodiment of the invention described herein is only one of the many embodiments this invention may take and I do not wish to be limited in the practice of my invention nor in my claims to the particular embodiment set forth.

What I claim is:

1. In a machine of the kind described, the combination of a frame, means for supporting the fruit, a pair of cutter heads each having a plurality of cutters disposed around a central axis movable toward and from the fruit, and means for producing a relative rotation of the fruit and cutter heads on the axis to effect the trimming of the fruit by the cutters.

2. In a machine of the kind described, the combination of a frame, a pair of cutter heads mounted opposite to each other, means for holding the fruit in position between the cutter heads, means for advancing the cutter heads and for rotating the same to trim the fruit.

3. In a machine of the kind described, the combination of a frame, a pair of cutter heads mounted opposite to each other, a holder for the fruit disposed between the cutter heads, automatic means for opening the holder to receive the fruit and for closing the same, and means for advancing the cutter heads and for rotating the same to effect the trimming of the fruit.

4. In a machine of the kind described, the combination of a frame, a pair of cutter heads mounted opposite to each other, a fruit holder with jaws mounted between the heads, automatic means for opening the jaws to receive the fruit and for closing the same upon the fruit, automatic means for feeding the fruit into the holder when open, and means for advancing the cutter heads and for rotating the same to trim the fruit.

5. In a machine of the kind described, the combination of a frame, a pair of cutter heads mounted opposite to each other, means for holding the fruit in position between the cutter heads, and means for limiting the forward movement of the cutter heads in trimming the fruit.

6. In a machine of the kind described, the combination of a frame, a pair of cutter heads mounted opposite to each other, means for holding the fruit in position between the cutter heads, and stops carried by the cutter heads for engaging the ends of the fruit to limit the forward movement of the cutter heads.

7. In a machine of the kind described, the combination of a frame, a pair of cutter heads mounted opposite to each other, means for holding the fruit in position between the cutter heads, means for rotating the cutter heads to trim the fruit and means for yieldingly exerting force upon the cutter-heads to advance the same to engage the fruit, and stops carried by the cutter-heads for engaging the ends of the fruit to limit the amount of advance of the cutter heads.

8. In a machine for trimming pineapples, the combination of a frame, a pair of cutter-heads mounted opposite to each other, each head having cutters mounted so as to trim the ends of the fruit, means for holding the fruit in position between the cutter heads, means for rotating the cutter heads to trim the fruit, and means for advancing the cutter heads including a spring for yieldingly forcing the cutter-heads forward, and stops carried by the cutter heads for engaging the ends of the fruit to limit the advancing movement of the cutter-heads.

9. In a machine of the kind described, the combination of means for supporting the fruit, a pair of rotatably supported cutter-heads, means for advancing the cutter-heads longitudinally along their axis of rotation to bring the cutters into contact with the fruit, rollers carried by the cutter-heads for rotating the cutters and annular raceways engaged by the peripheries of the rollers, for rotating the rollers to drive the cutters.

10. In a cutter head construction for trimming fruit, the combination of a cutter spindle and cutter head, a bracket adjustably mounted on the side of the cutter-head, a rotary cutter rotatably supported in the bracket with its axis disposed in an inclined position with respect to the axis of the spindle, and means for rotating the cutter head on its axis and for rotating the cutter on its axis.

11. In a cutter-head construction, the combination of a rotary cutter head with its spindle, a pair of oppositely disposed brackets attached on the sides of the cutter head, a rotary cutter corresponding to each bracket, and having a shaft rotatably mounted in its bracket and disposed in an inclined position with respect to the axis of the head, and means for rotating the cutter-head on its axis, and for rotating the cutter shafts on their axes.

12. In a cutter-head construction, the combination of a rotary cutter head with its spindle, a pair of oppositely disposed brackets attached on the sides of the cutter head, a rotary cutter corresponding to each bracket, and having a shaft rotatably mounted in its bracket and disposed in an inclined position with respect to the axis of the head, means for rotating the cutter-head on its axis, and for rotating the cutter shafts on their axes, and means for effecting adjustment of the brackets on the cutter head to alter the position of the cutters with relation to the cutter-head.

13. In a cutter-head construction, the combination of a rotary cutter-head mounted to rotate on its axis, a pair of oppositely disposed cutters having shafts respectively rotatably mounted on the cutter-head, means for rotating the cutter-head on its axis, and flexible shafts with means for rotating the same and connected with the rotary cutters for rotating the cutters.

14. In a machine of the kind described, the combination of a frame, a fruit-holder constructed to open on its side to admit the fruit, a feed device normally held in an upright position opposite the fruit holder, for temporarily holding the fruit, automatic means for opening the fruit holder and for actuating the feed-device to transfer the fruit from the feed-device into the holder, said automatic means operating thereafter to close the fruit holder about the fruit.

15. In a machine of the kind described, the combination of a frame, a fruit holder including a pair of movable jaws operating when moved apart to open the side of the fruit holder, a feed-device for temporarily holding the fruit adjacent the fruit holder, and automatic means for controlling the jaws and the feed device for transferring the fruit from the feed-device to the fruit holder and for closing the jaws of the fruit holder thereafter to clamp the fruit.

16. In a machine of the kind described, the combination of a frame, a fruit-holder supported thereon and having a pair of separable jaws operating when moved apart to open the fruit holder on its side, a feed device mounted to rock on an axis opposite the fruit holder and having means for yieldingly holding the same in an upright position, automatic means for actuating the jaws to separate the same, and for rocking the feed device to transfer the fruit to the holder, said automatic means operating thereafter to close the jaws and clamp the fruit.

17. In a machine of the kind described, the combination of means for supporting the fruit in a fixed position, a rotary cutter head having a spindle guided to slide longitudinally in the frame, and toward the fruit holder, means for moving the cutter head toward the fruit holder including a spring through which the moving force is imparted, cutters carried by the cutter head to operate upon the fruit, and a stop gage carried by the cutter-head to engage the fruit and limit the forward movement of the cutter head.

Signed at Honolulu, Terr. of Hawaii, this 23d day of January, 1924.

FRANCIS CHARLES MONKS.